US008891531B2

(12) United States Patent  (10) Patent No.: US 8,891,531 B2
Dickens et al.  (45) Date of Patent: *Nov. 18, 2014

(54) BRIDGE FOR IMPLEMENTING A CONVERGED NETWORK PROTOCOL TO FACILITATE COMMUNICATION BETWEEN DIFFERENT COMMUNICATION PROTOCOL NETWORKS

(75) Inventors: Louie A. Dickens, Tucson, AZ (US); Roger G. Hathorn, Tucson, AZ (US); Michael E. Starling, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/472,123

(22) Filed: May 15, 2012

(65) Prior Publication Data

US 2012/0254452 A1  Oct. 4, 2012

Related U.S. Application Data

(63) Continuation of application No. 12/916,405, filed on Oct. 29, 2010.

(51) Int. Cl.
| | | |
|---|---|---|
| *H04L 12/66* | (2006.01) | |
| *H04L 12/28* | (2006.01) | |
| *G06F 15/16* | (2006.01) | |
| *H04L 12/46* | (2006.01) | |
| *H04L 29/06* | (2006.01) | |

(52) U.S. Cl.
CPC ............ *H04L 69/08* (2013.01); *H04L 12/4625* (2013.01); *H04L 69/18* (2013.01); *H04L 12/4633* (2013.01)
USPC ...................... 370/395.5; 370/395.6; 370/401; 370/466; 398/58; 709/228; 709/230; 709/249

(58) Field of Classification Search
USPC .............. 370/395.5, 395.6, 401, 466; 398/58; 709/228, 230, 249
See application file for complete search history.

(56) References Cited

U.S. PATENT DOCUMENTS

7,969,989 B2   6/2011  Hirata
8,027,354 B1 *  9/2011  Portolani et al. .............. 370/431
(Continued)

OTHER PUBLICATIONS

"DCB and FCoE", Brocade, [online][retrieved Sep. 26, 2010] http://www.brocade.com/products-solutions/technology-architecture/dcb-. . . , pp. 1-3.

(Continued)

*Primary Examiner* — Alpus H Hsu
(74) *Attorney, Agent, or Firm* — David W. Victor; Konrad Raynes Davda & Victor LLP

(57) ABSTRACT

A first adaptor implements a first communication protocol and a second adaptor implements a converged network protocol, which facilitates communication of packets encoded with a second communication protocol with a third communication protocol network. Parameters are configured in a memory for communication between the first adaptor and the second adaptor in the converged network protocol to indicate to the second adaptor that the converged network protocol is supported, wherein the first adaptor does not support the converged network protocol. A packet is received at the first adaptor encoded in the second communication protocol and forwarded to the second adaptor to forward to the third communication protocol network. A command is received at the second adaptor, directed to the first adaptor, to implement a function in the converged network protocol using the parameters in the memory to support transmission of packets between the first and the second adaptors.

29 Claims, 5 Drawing Sheets

(56) References Cited

U.S. PATENT DOCUMENTS

| | | | |
|---|---|---|---|
| 8,214,528 B2 | | 7/2012 | Hirata et al. |
| 8,351,442 B1 | * | 1/2013 | McGlaughlin ............... 370/401 |
| 8,369,296 B2 | * | 2/2013 | Armstrong et al. .......... 370/338 |
| 8,385,356 B2 | * | 2/2013 | Armstrong et al. .......... 370/401 |
| 8,391,300 B1 | | 3/2013 | Dropps et al. |
| 8,594,090 B2 | * | 11/2013 | Armstrong et al. .......... 370/390 |
| 8,644,139 B2 | * | 2/2014 | Armstrong et al. .......... 370/229 |
| 8,705,351 B1 | * | 4/2014 | McGlaughlin et al. ....... 370/230 |
| 2006/0053021 A1 | | 3/2006 | Bystedt |
| 2009/0034522 A1 | | 2/2009 | Hayes et al. |
| 2009/0037977 A1 | | 2/2009 | Gai et al. |
| 2009/0052345 A1 | * | 2/2009 | Brown et al. ................ 370/254 |
| 2009/0052346 A1 | * | 2/2009 | Brown et al. ................ 370/254 |
| 2009/0052461 A1 | * | 2/2009 | Brown et al. ................ 370/401 |
| 2009/0063701 A1 | * | 3/2009 | Bagepalli et al. ............ 709/238 |
| 2009/0245791 A1 | * | 10/2009 | Thaler et al. ................... 398/45 |
| 2010/0097941 A1 | | 4/2010 | Carlson et al. |
| 2010/0115132 A1 | * | 5/2010 | Hirata et al. ................. 709/245 |
| 2010/0150174 A1 | * | 6/2010 | Bhide et al. .................. 370/474 |
| 2010/0183024 A1 | * | 7/2010 | Gupta .......................... 370/463 |
| 2010/0223397 A1 | | 9/2010 | Elzur |
| 2010/0232419 A1 | * | 9/2010 | Rivers ......................... 370/352 |
| 2010/0302754 A1 | * | 12/2010 | Nordin et al. ................ 361/810 |
| 2011/0032933 A1 | * | 2/2011 | Eisenhauer et al. .......... 370/389 |
| 2011/0058573 A1 | * | 3/2011 | Balakavi et al. ............. 370/463 |
| 2011/0135303 A1 | * | 6/2011 | Hufferd .......................... 398/45 |
| 2011/0188511 A1 | * | 8/2011 | Di Benedetto ............... 370/419 |
| 2011/0258641 A1 | * | 10/2011 | Armstrong et al. .......... 719/327 |
| 2011/0261826 A1 | * | 10/2011 | Armstrong et al. .......... 370/401 |
| 2012/0106558 A1 | | 5/2012 | Dickens et al. |

OTHER PUBLICATIONS

"Data center bridging", Wikipedia, [online][retrieved Oct. 14, 2010] http://en.wikipedia.org/w/index.php?title=Data_center_bridging &printab . . . , pp. 1-3.

M. Lippitt, et al., "Fibre Channel over Ethernet (FCOE)", EMC Techbooks, 2008, pp. 1-422.

Fibre Channel over Ethernet (FCoE): Using FocalPoint Switches, Fulcrum Microsystems, White Paper, Nov. 2008, pp. 1-8.

J. Tate, "An Introduction to Fibre Channel over Ethernet, and Fibre Channel over Convergence Enhanced Ethernet", IBM Corporation, Redpaper, 2009, pp. 1-18.

"Fibre Channel Backbone—5 (FC-BB-5), Rev2.00", INCITS working draft proposed American National Standard for Information Technology, Jun. 4, 2009, pp. 1-180.

J.L. Hufferd, Fibre Channel over Ethernet (FCoE), SNIA Education, 2010.

J. Onisick, "Data Center Bridging", [online][retrieved Sep. 26, 2010] http://www.definethecloud.net/?p=31, pp. 1-5.

J. Onisick, "Fibre Channel over Ethernet", [online][retrieved Sep. 26, 2010] http://www.definethecloud.net/?p=80, pp. 1-6.

J. Onisick, "FCoE initialization Protocol (FIP) Deep Dive", [online][retrieved Sep. 26, 2010] http://www.definethecloud.net/?tag=dcbx, pp. 1-6.

C. Desanti, "FCoE: The Technology", Ether Technology Summit, Feb. 2010, pp. 1-4.

G. McAlpine, et al., "An Architecture for Congestion Management in Ethernet Clusters", IEEE, Proceeds of the 19th IEEE International Parallel and Distributed Processing Symposium (IPDPS'05), 2010, pp. 1-8.

PCT International Search Report and Written Opinion dated Jan. 24, 2012 for Serial No. PCT/EP2011/066765, filed Sep. 27, 2011.

M. Wadekar, et al., "DCB Capability Exchange Protocol Base Specification", Rev. 1.01, Nov. 10, 2008, pp. 1-33.

Preliminary Amendment filed May 15, 2012, pp. 1-9, for U.S. Appl. No. 12/916,405, entitled "A Bridge for Implementing a Converged Network Protocol to Facilitate Communication Between Difference Communication Protocol Networks", by inventors L.A. Dickens, R.G. Hathorn, M.E. Starling and D.J. Winarski.

German Office Action dated May 17, 2013, 1-7, for Serial No. 11 2011 102 896.2.

Information Materials for IDS dated May 27, 2013, pp. 1-2.

"Virtual Bridged Local Area Networks—Amendment 7: Congestion Management", IEEE, P802.1 au/D0.4, Nov. 12, 2007, pp. 44.

"Standard for Information Technology—Part 11: Wireless LAN Medium Access Control (MAC) and Physical Layer (PHY) Specifications, Amendment 2: Fast Basic Service Set (BSS) Transition", IEEE, Std 802.11r, Jul. 15, 2008, pp. 126.

"Priority Flow Control: Build Reliable Layer 2 Infrstructure", Cisco, White Paper, 2009, pp. 8.

"Standard for Information Technology—Part 11: Wireless LAN Medium Access Control (MAC) and Physical Layer (PHY) Specifications, Amendment 6: Wireless Access in Vehicular Environments", IEEE, Std 802.11p, Jul. 15, 2010, pp. 51.

"Virtual Bridged Local Area Networks—Amendment 13: Congestion Notification", IEEE, Std. 802.1Qau, Apr. 23, 2010, pp. 135.

Reinemo et al., "Ethernet for High-Performance Data Centers: on the New IEEE Datacenter Bridging Standards", IEEE, Jul./Aug. 2010, pp. 10.

"Virtual Bridged Local Area Networks—Amendment: Priority Based Flow Control", IEEE, P802.1Qbb/D2.3, May 25, 2010, pp. 40.

Pepelnjak, Introduction to 802.1Qaz (Enhanced Transmission Selection—ETS), Gestaltit, [online][retrieved Oct. 21, 2013]. http://gestaltit.com/all/tech/networking/ivan/introduction-802-1qaz-enhanced-transmissio . . . .

Office Action dated Dec. 14, 2012, pp. 1-19, for U.S. Appl. No. 12/916,405, filed Oct. 29, 2010, by inventors L.A. Dickens, et al., (18.371).

Response dated Mar. 14, 2013, pp. 1-17, to Office Action dated Dec. 14, 2012, pp. 1-19, for U.S. Appl. No. 12/916,405, filed Oct. 29, 2010, by inventors L.A. Dickens, et al., (18.371).

*Ex Parte Quayle* Action dated May 29, 2013, pp. 1-4, for U.S. Appl. No. 12/916,405, filed Oct. 29, 2010, by inventors L.A. Dickens, et al., (18.371).

Response dated Jul. 29, 2013, pp. 9, to *Ex Parte Quayle* Action dated May 29, 2013, pp. 1-4, for U.S. Appl. No. 12/916,405, filed Oct. 29, 2010, by inventors L.A. Dickens, et al., (18.371).

NOA dated 080913, pp. 9, for U.S. Appl. No. 12/916,405, filed Oct. 29, 2010, by inventors L.A. Dickens, et al., (18.371).

* cited by examiner

BRIDGE FOR IMPLEMENTING A CONVERGED NETWORK PROTOCOL TO FACILITATE COMMUNICATION BETWEEN DIFFERENT COMMUNICATION PROTOCOL NETWORKS

CROSS-REFERENCE TO RELATED APPLICATION

This application is a continuation of U.S. patent application Ser. No. 12/916,405, filed Oct. 29, 2010, which application is incorporated herein by reference in its entirety.

BACKGROUND OF THE INVENTION

1. Field of the Invention

The present invention relates to a computer program product, system, and method for a bridge for implementing a converged network protocol to facilitate communication between different communication protocol networks.

2. Description of the Related Art

Fibre Channel over Ethernet (FCoE) is a protocol standard that encapsulates Fibre Channel (FC) frames in Ethernet frames to allow an Ethernet network to communication with low latency, high performance networks, such as Fibre Channel. FCoE requires extensions or enhancements to the Ethernet protocol. The enhanced functions provided are referred to as Data Center Bridging (DCB) and Converged Enhanced Ethernet (CEE). A FCoE fabric is built with switches and adaptors that support the CEE and DCB protocols. An FCoE fabric includes a CEE/DCB switch that has ports for Fibre Channel connections and ports to connect to CEE ports supporting the enhanced CEE/DCB functions. Enhanced Ethernet ports are implemented in a Converged Network Adaptors (CNA) and the switches for interfacing between the FCoE fabric and Fibre Channel network are also known as Fibre Channel Forwarders (FCF). The FCoE fabric, also referred to as a Data Center Fabric, interacts with a real Fibre Channel fabric, and FCoE supports advanced Fibre Channel features.

In FCoE, frames from Fibre Channel packets are encapsulated into an Ethernet frame by a logical end point (LEP) which is a translator between the Ethernet and Fibre Channel protocols. The CNA adaptors, FCoE switches, and FCFs comprise LEPs. Further, software can be provided to perform the LEP operations on a server.

However, to integrate Ethernet networks with FCoE switches, the servers and hosts in the Ethernet network must have adaptors that support the CEE protocol, such as CNA adaptors. Replacing the relatively inexpensive legacy Ethernet adaptors, i.e., those supporting IEEE 802.11, with adaptors that support FCoE can be expensive.

There is a need in the art for improved techniques for integrating a legacy Ethernet network with a FCoE network to allow lossless communication with a Fibre Channel fabric.

SUMMARY

Provided are a computer program product, system, and method for a bridge for implementing a converged network protocol to facilitate communication between different communication protocol networks. A first adaptor implements a first communication protocol and a second adaptor implementing a converged network protocol, wherein the converged network protocol facilitates communication of packets encoded with a second communication protocol with a third communication protocol network. Parameters are configured in a memory for communication between the first adaptor and the second adaptor in the converged network protocol to indicate to the second adaptor that the converged network protocol is supported, wherein the first adaptor does not support the converged network protocol. A packet is received at the first adaptor encoded in the second communication protocol directed to the third communication protocol network. The packet is forwarded to the second adaptor to forward to the third communication protocol network. A command is received at the second adaptor, directed to the first adaptor, to implement a function in the converged network protocol for communication between the first and second adaptors. Operations are performed to implement the function using the parameters in the memory to support transmission of packets between the first and the second adaptors.

DETAILED DESCRIPTION

Figure 1:
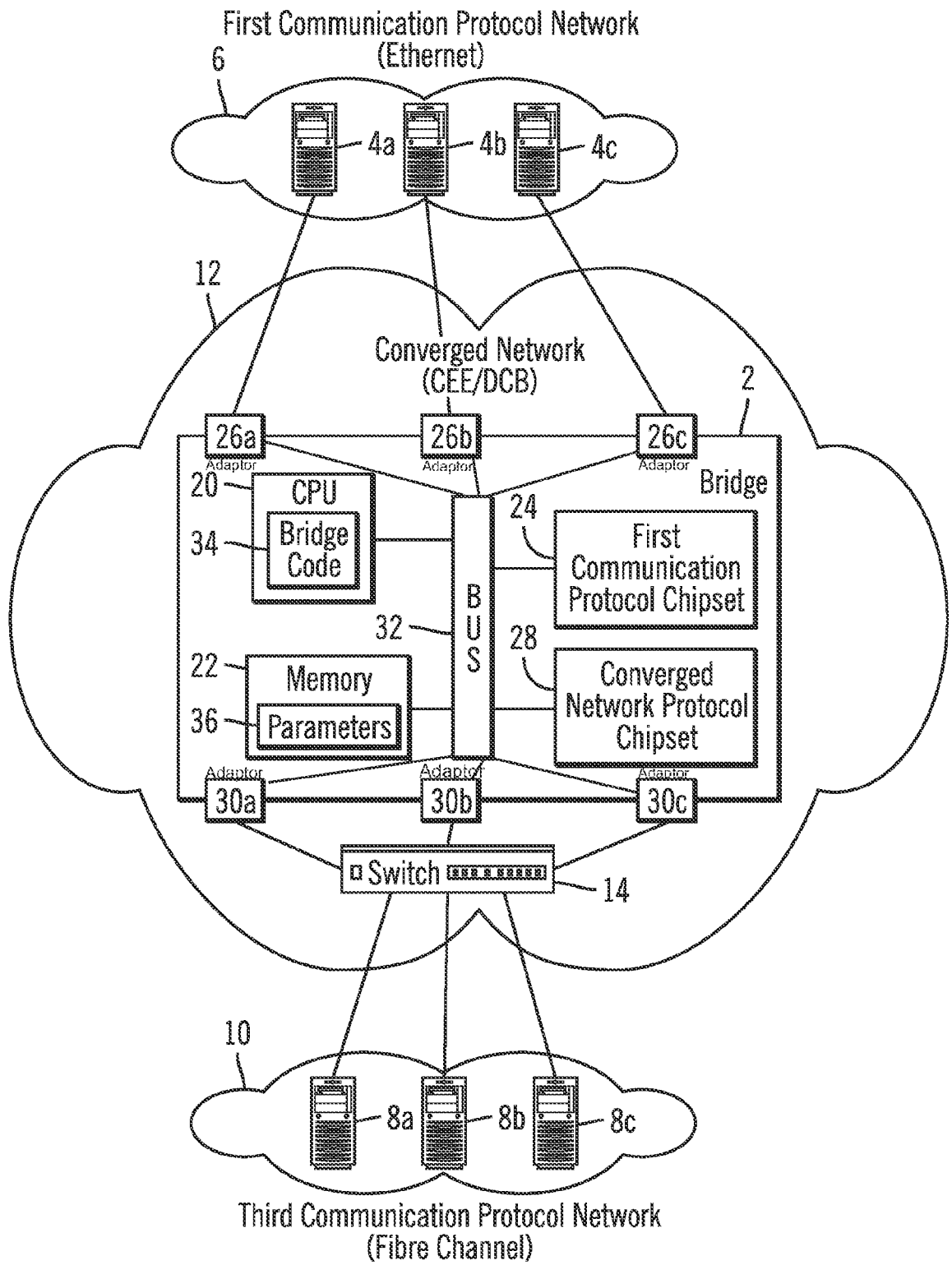
FIG. 1 illustrates an embodiment of a network computing environment.

FIG. 1 illustrates an embodiment of a network computing environment. A bridge 2 provides communication between hosts 4a, 4b, 4c in a first communication protocol network 6, such as legacy Ethernet, exchanging packets in a second communication protocol, such as Fibre Channel over Ethernet (FCoE) with hosts 8a, 8b, 8c, operating in a third communication protocol network 10, such as a Storage Area Network (SAN) or Fibre Channel network. The hosts 4a, 4b, 4c include adaptors having ports that communicate using the first communication protocol (e.g., Ethernet) and the hosts 8a, 8b, 8c include adaptors that communicate using the third communication protocol (e.g., Fibre Channel). The bridge 2 implements a converged network protocol to provide a converged network 12, such as a CEE/DCB network, that interfaces between the first communication protocol network 6 and the third communication protocol network 10. Packets transmitted from the hosts adaptors may be encoded with a second communication protocol, e.g., FCoE, by second communication protocol software in the hosts. The bridge 2 forwards packets via a second adaptor 30a, 30b, 30c to a port on a switch 14, such as a Fibre Channel Forwarder (FCF), that decapsulates the payload from the packet for transmission in the third communication protocol (e.g., Fibre Channel) to one of the hosts 8a, 8b, 8c in the third communication protocol network 10. In certain implementations, the bridge 2 provides for lossless transmission of packets from the first communication protocol network 6, which does not support lossless transmission, to the third communication protocol network 10, which does support lossless transmission. The switch 14 includes adaptors to support connections with hosts 8a, 8b, 8c in the third communication protocol network, and separate adaptors to support communication with the converged network 12, including the bridge 2 in the network 12. In this way, the bridge allows hosts 4a, 4b, 4c to maintain their legacy adaptors in the first communication protocol, without upgrading, to communicate with systems 8a, 8b, 8c supporting only the third communication protocol (e.g., Fibre Channel). Although the host adaptors 4a, 4b, 4c may only support the first communication protocol, the hosts 4a, 4b, 4c may include software capable of coding packets with second communication protocol information (e.g., FCoE), encapsulated into the first communication protocol packet.

The bridge includes a central processing unit (CPU) 20, such as one or more processors, a memory 22 to store parameters and other data, a first communication protocol chipset 24 to support communication using adaptors 26a, 26b, 26c with hosts 4a, 4b, 4c using the first communication protocol and a converged network protocol chipset 28 to support communication using adaptors 30a, 30b, 30c with one or more switches 14 using the second communication protocol. The adaptors 26a, 26b, 26c and 30a, 30b, 30c may each include one or more ports. A bus 32, comprising one or more bus interfaces, provides communication among the components 20, 22, 24, 26a, 26b, 26c, 28, and 30a, 30b, 30c.

The CPU 20 executes bridge code 34, which may be stored in a non-volatile storage in the bridge 2, to perform packet transfer operations between the adaptors 26a, 26b, 26c, 30a, 30b, 30c. Further, the CPU 20 may store in memory 22 parameters 36 for the second communication protocol to use to communicate via the adaptors 30a, 30b, 30c to the switch 14.

Although FIG. 1 shows chipsets 24 and 28 implementing the first communication protocol and converged network protocol, the functions of these protocols may be implemented in program instructions in the bridge code 34 executed by the CPU 20 to perform first communication protocol and converged network protocol related operations. Alternatively, some or all of the functions of the bridge code 34 may be implemented in hardware logic in an integrated circuit hardware component.

Although three of components 4a, 4b, 4c, 8a, 8b, 8c, 26a, 26b, 26c, 30a, 30b, 30c, are shown, there may be any number of these components, and there may be a same or different number of the different components. Further, although the adaptors 26a, 26b, 26c are shown as connected to hosts 4a, 4b, 4c they may also be connected to switches, further bridges, repeaters or other components before they are received at the hosts 4a, 4b, 4c. Although the adaptors 30a, 30b, 30c are shown as connected to a switch 14, they may also be connected directly to hosts 8a, 8b, 8c or other components, forwarders, repeaters, other switches, etc. Further, although in certain embodiments, the first communication protocol comprises legacy Ethernet, the second communication protocol comprises FCoE, the converged network protocol comprises CEE/DCB, and the third communication protocol comprises Fibre Channel, the first, second, third, and converged network communication protocols may comprise different communication protocols, such that the converged network protocol facilitates transmission of packets between a first communication protocol network and a third communication protocol network.

Figure 2:
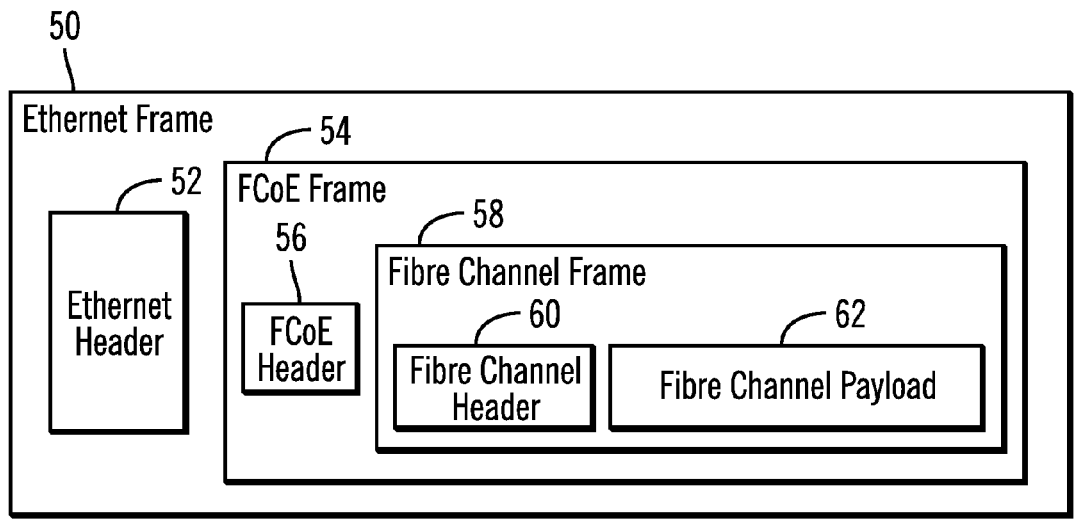
FIG. 2 illustrates an embodiment of an Ethernet frame encapsulating FCoE and Fibre Channel frames in a manner known in the prior art.

FIG. 2 illustrates an embodiment, as known in the prior art, of FCoE encapsulation of a Fibre Channel payload. An Ethernet frame 50 has an Ethernet header 52 of Ethernet header information and encapsulates an FCoE frame 54 that has an FCoE header 56 and a Fibre Channel frame 58 having a Fibre Channel header 60 and a Fibre Channel payload 62. The bridge 2 may receive an Ethernet packet 50 encapsulated with FCoE and Fibre Channel information at the second adaptors 30a, 30b, 30c and forward to the first adaptors 30a, 30b, 30c.

Figure 3:
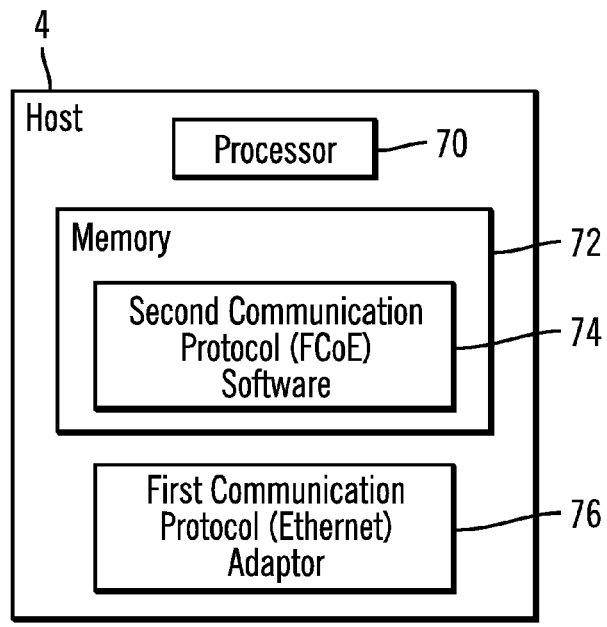
FIG. 3 illustrates an embodiment of a host.

FIG. 3 illustrates an embodiment of a host 4, such as hosts 4a, 4b, and 4c, including one or more processors 70, a memory 72 in which second communication protocol software 74 is loaded for execution by the processor 70, and a first communication protocol adaptor 76, e.g., Ethernet adaptor. In one embodiment, the second communication protocol software 74 provides a software implementation of a FCoE logical end point (LEP) that encapsulates FCoE frame 54 information into the Ethernet frame 50. Further, the second communication protocol software 74 can access and package the payload 62 into the FCoE frame 54 within the Ethernet frame 50 for use ultimately by the switch 14, which can access the FCoE frame 54 to extract the payload 62 to provide to the Fibre Channel network 10. The first communication protocol adaptor 76, such as a legacy Ethernet adaptor, can transmit that FCoE frame 50 to the bridge 0, although the adaptor 76 does not include FCoE (second communication protocol) functionality to utilize the FCoE frame 54 information.

In certain embodiments, the second communication protocol software 74 does not include the capability to handle converged network protocol operations (CEE/DCB) that are needed to support convergence and interoperability with the third communication protocol network 10, e.g., Fibre Channel. For instance, in one embodiment, the converged network protocols not supported by the second (FCoE) communication protocol software 74 may comprise CEE/DCB protocols expected by the switch 14, such as priority based flow control, as described in Institute of Electrical and Electronics Engineers (IEEE) 802.1 Qbb, Enhanced Transmission Selection, as described in IEEE 802.1Qaz, Congestion Notification as described in IEEE 802.1Qau, and Data Center Bridging Exchange (DCBX). Priority-based Flow Control (PFC) provides a link level flow control mechanism that can be controlled independently for each Class of Service (CoS) to ensure zero loss under congestion in DCB networks. Enhanced Transmission Selection (ETS) provides a common management framework for assignment of bandwidth to CoS-based traffic classes. Congestion Notification provides end-to-end congestion management for protocols that are capable of transmission rate limiting to avoid frame loss to supplement protocols such as Ethernet that do have native congestion management. Congestion Notification provides more timely reaction to network congestion. Data Center Bridging Capabilities Exchange Protocol (DCBX) is a discovery and capability exchange protocol that is used for conveying capabilities and configuration of the above features between neighbors to ensure consistent configuration across the network. The bridge 2 includes the converged network protocol chipset 28 to support the converged network protocols not supported in the hosts 4a, 4b, 4c that are required for communication with the switch 14 and the third communication protocol network 10. Thus, the bridge 2 needs to interface between those converged network protocols required by the switch 14 that are not supported by the components in the hosts 4a, 4b, 4c, such as the second communication protocol (FCoE) software 74 and the first communication protocol (Ethernet) adaptor 76.

Figure 4:
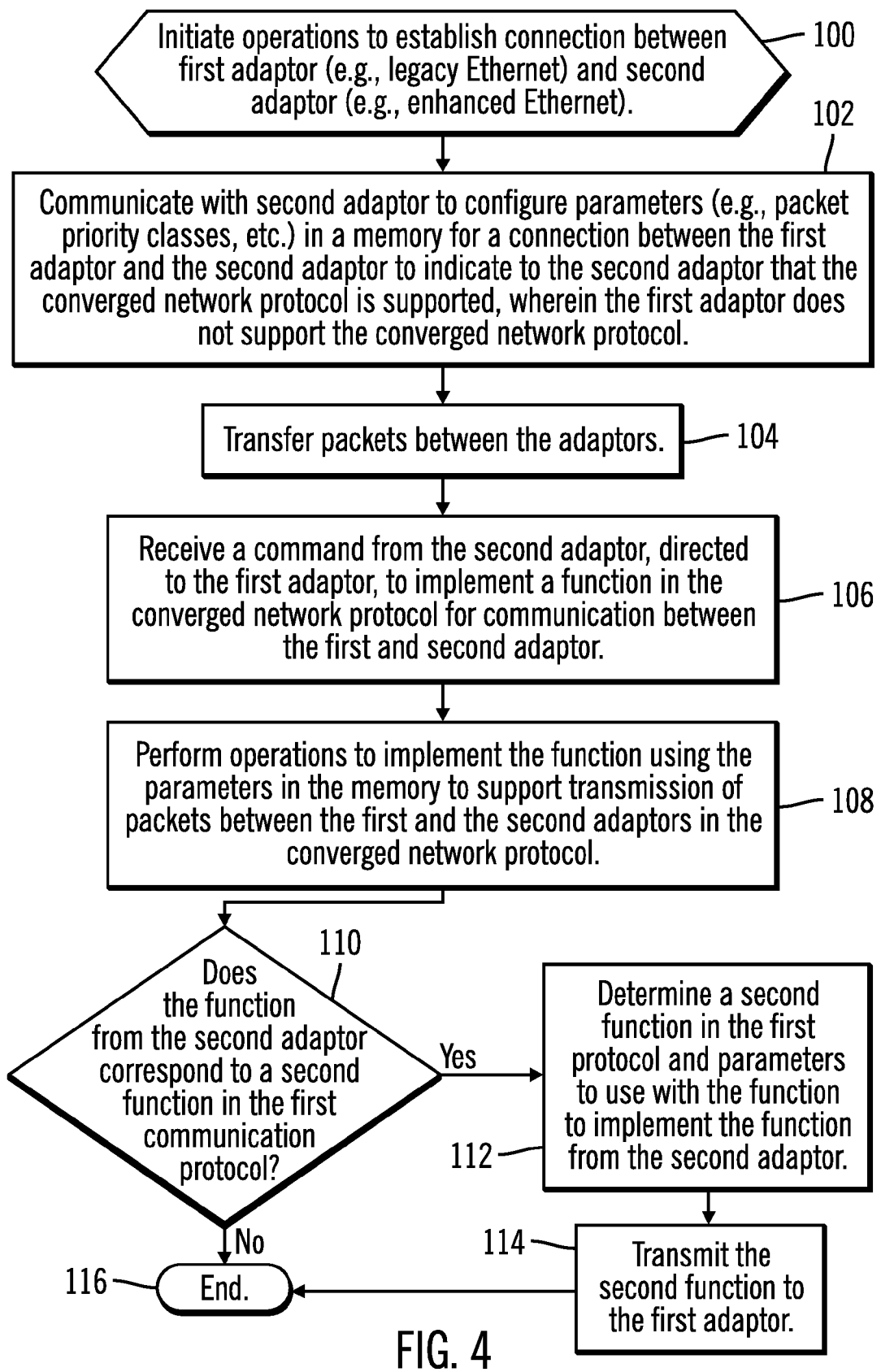
FIG. 4 illustrates an embodiment of operations to establish a connection between a first adaptor and second adaptor.

FIG. 4 illustrates an embodiment of operations performed by the bridge 2 components, including the CPU 20 executing the bridge code 34 and chipsets 24 and 28. The bridge 2 initiates (at block 100) operations to establish connection between a first adaptor 26a, 26b or 26c (e.g., legacy Ethernet) and second adaptor 30a, 30b or 30c (e.g., enhanced Ethernet). The adaptors 26a, 26b, 26c provide connections to systems 4a, 4b, 4c having first communication protocol adaptors and the adaptors 30a, 30b, and 30c provide connections to systems 8a, 8b, 8c having third communication protocol adaptors via a switch 14 supporting the third communication protocol. The bridge 2 would utilize the converged network protocol chipset 28 to perform handshaking and initialization operations with the switch 14. At block 102, the bridge 2 communicates with a second adaptor 30a, 30b or 30c to configure parameters 36 (e.g., packet priority classes, etc.) in the memory 22 for a connection between the first adaptor 26a, 26b or 26c and the second adaptor 30a, 30b or 30c to indicate to the second adaptor 30a, 30b, or 30c that the converged network protocol is supported, wherein the first adaptor 26a, 26b or 26c does not support the converged network protocol. The bridge 2 then transfers (at block 104) packets between first 26a, 26b or 26c and second 30a, 30b or 30c adaptors to transfer between hosts 4a, 4b, 4c in the first communication protocol network 6 and hosts 8a, 8b, 8c in the third communication protocol network 10 via the switch 14. In certain embodiments, the bridge 2 does not modify the packets, which are encoded in the second communication protocol, e.g., FCoE, which can be processed by the switch 14 and the second communication protocol software (FCoE) 74 in the hosts 4a, 4b, 4c. The bridge receives (at block 106) a packet having a function in the converged network protocol from the second adaptor 30a, 30b or 30c, directed to the first adaptor 26a, 26b or 26c. This converged network protocol function may not be supported in the second communication protocol software 74. The bridge 2 performs (at block 108) operations to implement the function using the parameters 36 in the memory 22 to support transmission of packets in the converged network communication protocol, e.g., CEE/DCB. Further, the bridge 2 may determine (at block 110) whether the function or command from the second adaptor 30a, 30b or 30c corresponds to a second function in the first communication protocol. If so, the bridge 2 determines (at block 112) a second function in the first communication protocol and parameters 36 to use with the function to implement the function in the converged network protocol from the second adaptor 30a, 30b or 30c. The bridge 2 transmits (at block 114) the second function, in the first communication protocol, to the first adaptor 26a, 26b or 26c to forward to the target host 4a, 4b or 4c. If (from the no branch of block 110) the function from the second adaptor 30a, 30b or 30c does not correspond to a second function in the first communication protocol or after transmitting the second function to the first adaptor 26a, 26b or 26c (from block 114), control ends (at block 116).

For instance, the configuration parameters for the converged network protocol maintained in the memory 22 may indicate classes of packets recognized by the second adaptor 30a, 30b or 30c and the first function may comprises a pause for a selected one of the classes of packets from the first adaptor in the converged network protocol. In such case, the bridge 2 may send a pause instruction in the first communication protocol to the first adaptor 26a, 26b or 26c to cause the first adaptor 26a, 26b or 26c or hosts 4a, 4b or 4c to pause the sending of all packets from the connected host 4a, 4b or 4c, i.e., provide implementation of the converged network protocol pause function. The pause instruction in the first communication protocol may not support pausing for a selected class of packets, and may instead pause for packets regardless of a classification indicated according to the converged network protocol.

Figure 5:
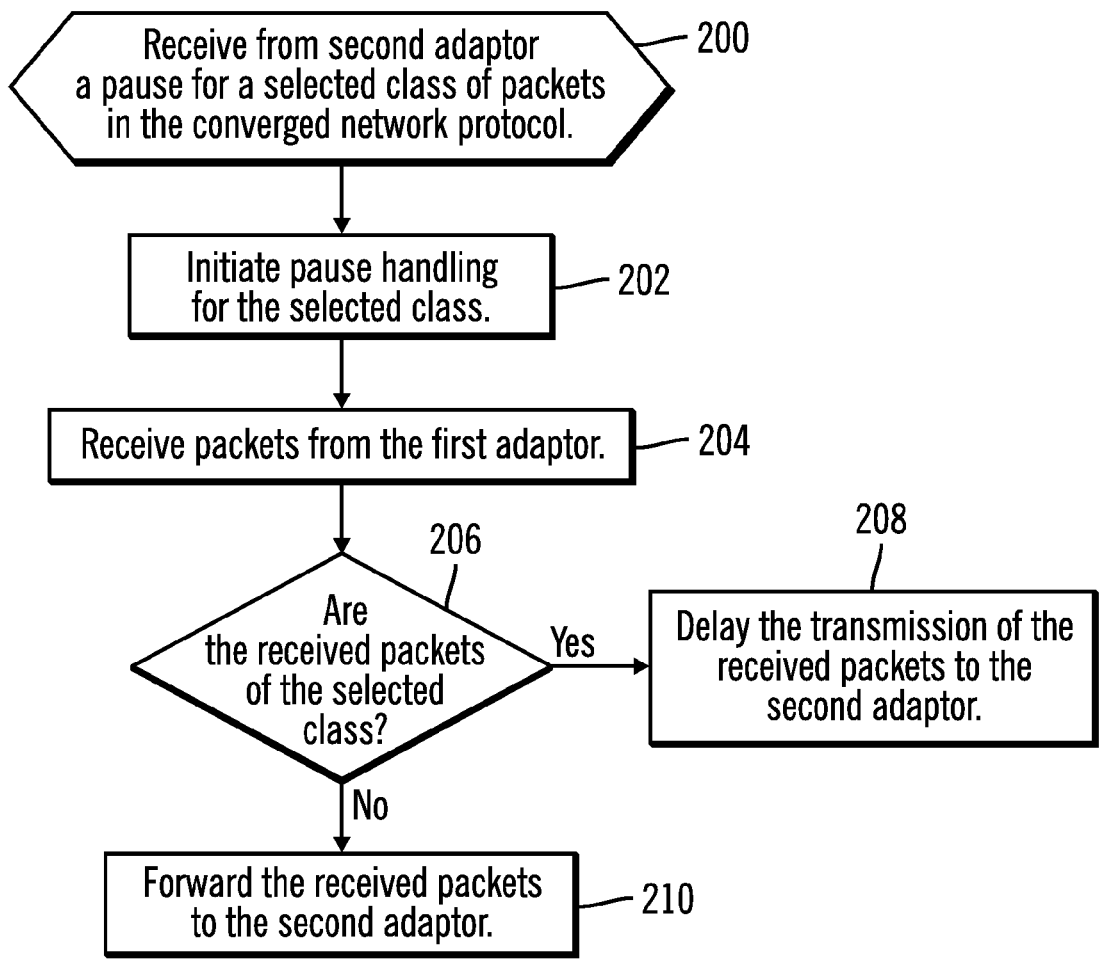
FIG. 5 illustrates an embodiment of operations to process a pause instruction received at the second adaptor.

FIG. 5 illustrates an embodiment of operations performed by the bridge 2 to process a pause command in the converged network protocol received via one adaptor 30a, 30b or 30c from the switch 14 or other component. Upon receiving (at block 200) at the second adaptor 30a, 30b or 30c a pause for a selected class of packets in the converged network protocol, such as a priority based flow control pause command in the DCB protocol, the bridge 22 initiates (at block 202) a pause handling for the selected class. Upon receiving (at block 204) packets from the first adaptor 26a, 26b or 26c while the pause is initiated, the bridge 2 determines (at block 206) whether the received packets are of the selected class. This may be determined by considering information in the header or fields of the first communication protocol packet, the source or target of the message, etc. If (at block 206) the received packet is of the selected class, then the bridge 2 delays (at block 208) the transmission of the received packets to the second adaptor 30a, 30b or 30c. If (at block 206) the received packets are not categorized in the selected class for the pause, then the received packets are forwarded (at block 210) to the second adaptor 30a, 30b or 30c to forward to the switch 14 and, eventually, third communication protocol network 10.

Figure 6:
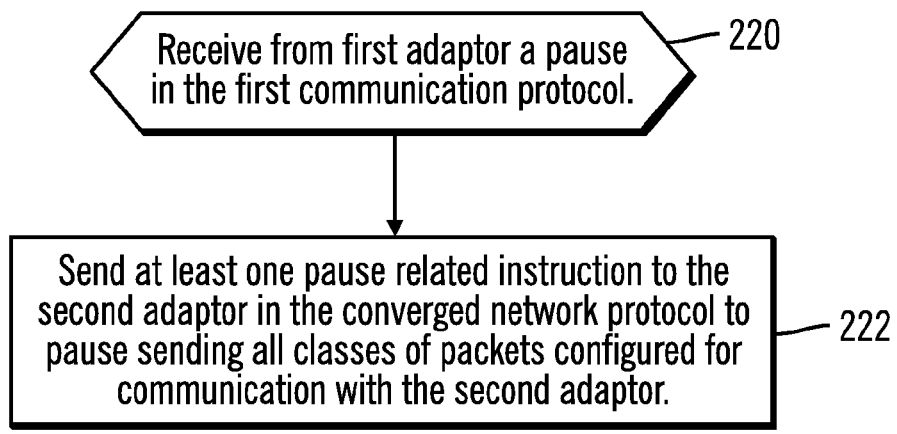
FIG. 6 illustrates an embodiment of operations to process a pause instruction received at the first adaptor.

FIG. 6 illustrates an embodiment of operations performed by the bridge 2 to process a pause command in the first communication protocol received via the first adaptor 26a, 26b or 26c. Upon receiving (at block 220) from a first adaptor 26a, 26b, 26c a pause in the first communication protocol initiated from a host 4a, 4b or 4c, the bridge 2 sends (at block 222) at least one pause related instruction to the second adaptor 30a, 30b or 30c in the converged network protocol to pause sending all classes of packets configured for communication with the second adaptor 30a, 30b or 30c, such as to pause packets being forwarded to a host 8a, 8b, 8c in the third communication protocol (e.g., Fibre Channel) network 10.

Figure 7:
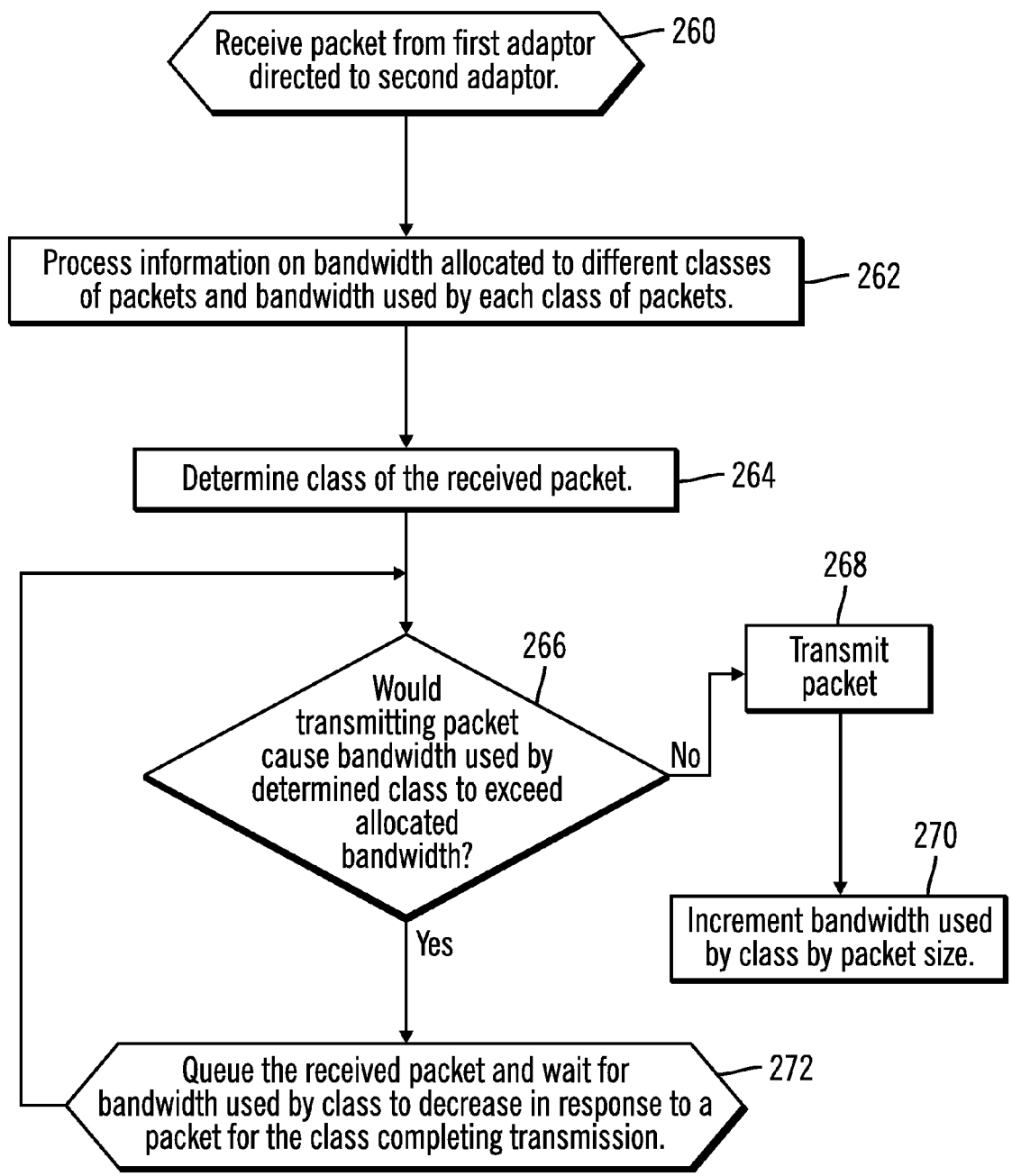
FIG. 7 illustrates an embodiment of operations to process a received packet to manage class bandwidth allocations.

FIG. 7 illustrates an embodiment of operations performed by the bridge 2 to manage bandwidth for classes of packets according to the converged network protocol (e.g., DCB). The information on the bandwidth for the different classes of packets would have been communicated via the second adaptor 30a, 30b or 30c from the switch 14. Upon receiving (at block 260) a packet from the first adaptor 26a, 26b or 26c in the first communication protocol, the bridge 2 processes (at block 262) information on bandwidth allocated to the different classes of packets and bandwidth used by each class of packets, which information may be stored as parameters 36 in the memory 22. The class of the packet is determined (at block 264), which may be determined by inspecting fields in the received packet, such as the FCoE header 56. The bridge 2 then determines (at block 266) whether transmitting the packet would cause the bandwidth used by the determined class to exceed an allocated bandwidth for that class. This requires that the bridge 2 maintain in memory 22 the current allocated bandwidth for each class and maximum allowed bandwidth for each class. If (at block 266) transmitting the packet would not cause the bandwidth allocated to the class of the packet to exceed its allocated maximum bandwidth, then the bridge 2 transmits (at block 268) the packet via the second adaptor 30a, 30b or 30c to the switch 14 and third communication protocol network 10. The bandwidth used for that class is then incremented (at block 370) by the size of the packet transferred. Otherwise, if (at block 266) transmitting the packet would cause the bandwidth for the class to be exceeded, then the bridge 2 queues (at block 272) the received packet and waits for the bandwidth of the class to decrease in response to another packet for the class completing transmission, and then returns to block 266 to determine whether to transmit the queued packet.

Certain operations between the switch 14 and the hosts 4a, 4b, 4c may be handled by the second communication protocol software 72 in the hosts 4a, 4b, 4c. For instance, the bridge 2 may forward a keep alive packet in the second communication protocol received via the second adaptor 30a, 30b or 30c to the first adaptor 26a, 26b or 26c. The second communication protocol software 72 may then process the keep alive request in the FCoE frame 54 and then generate a reply Ethernet frame 50 having a keep alive response in the second communication protocol, e.g., in the FCoE frame 54, to return to the switch 14 via the bridge 2.

Described embodiments provide a bridge having adaptors to communicate with a first communication protocol, such as legacy Ethernet, and having adaptors to communicate using a converged network protocol (e.g., CEE/DCB) that is used to facilitate transfer of packets to a third communication protocol network. In the described embodiments, hosts 4a, 4b, 4c in the first communication protocol network 6 can participate in networks providing the converged network protocol without having to have their network adaptors upgraded because the bridge 2 facilitates communication between the protocols.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the bridge system of FIG. 1 may provide clients, and other servers and software and/or hardware components in a networked cloud of the first and third communication protocol networks with second communication protocol network functions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
communicating with a first adaptor implementing a first communication protocol and a second adaptor implementing a converged network protocol, wherein the converged network protocol facilitates communication of packets encoded with a second communication protocol with a third communication protocol network;

configuring parameters in a memory for communication between the first adaptor and the second adaptor in the converged network protocol to indicate to the second adaptor that the converged network protocol is supported, wherein the first adaptor does not support the converged network protocol;

receiving a packet at the first adaptor encoded in the second communication protocol directed to the third communication protocol network;

forwarding the packet to the second adaptor and then to the third communication protocol network;

receiving a command at the second adaptor, directed to the first adaptor, to implement a function in the converged network protocol for communication between the first and second adaptors; and implementing the function using the parameters in the memory to support transmission of packets between the first and the second adaptors in the converged network protocol.

2. The method of claim 1, wherein the first adaptor comprises a legacy Ethernet adaptor, wherein the first communication protocol comprises the Ethernet protocol, wherein the second adaptor comprises an enhanced Ethernet adaptor, the second communication protocol comprises Fibre Channel over Ethernet (FCoE), the converged network protocol includes the Data Center Bridging Exchange protocol that supports lossless transmission with a Fibre Channel network, and wherein the third communication protocol network comprises the Fibre Channel network.

3. The method of claim 1, wherein the function comprises a first function, wherein the first function in the converged network protocol is not supported in the first communication protocol and in the first adaptor, and wherein performing the operations to implement the first function from the second adaptor comprises:

determining a second function in the first communication protocol and parameters to use with the first function to implement the first function from the second adaptor; and transmitting the second function to the first adaptor.

4. The method of claim 1, wherein the configuration parameters indicate traffic classes for packets recognized in the converged network protocol but not the first communication protocol, wherein the function comprises a pause for a selected one of the classes of packets from the first adaptor, wherein the implementing the function further comprises:

receiving packets from the first adaptor;

determining whether the received packets are of the selected class;

delaying the transmission of the received packets to the second adaptor in response to determining that the packets are of the selected class; and forwarding the received packets to the second adaptor in response to determining that the packets are not of the selected class.

5. The method of claim 1, wherein the configuration parameters indicate classes of packets recognized in the converged network protocol but not the first communication protocol, wherein the function comprises a pause instruction in the converged network protocol for a selected one of the classes of packets from the first adaptor, and wherein the implementing the function further comprises:

sending a pause instruction in the first communication protocol to the first adaptor to cause the first adaptor to pause sending all packets.

6. The method of claim 1, wherein the function comprises a pause instruction in the first communication protocol from the first adaptor to instruct the second adaptor to stop sending all packets, wherein the implementing the function further comprises:
in response to the pause instruction, sending at least one instruction to the second adaptor in the converged network protocol to pause sending all classes of packets configured for communication with the second adaptor.

7. The method of claim 1, wherein the function comprises a keep alive request from the second adaptor, and wherein the implementing the function further comprises sending the packet including the keep alive request to the first adaptor, wherein the keep alive request is processed by second communication protocol software in a host in a first communication protocol network.

8. The method of claim 1, wherein the configuration parameters indicate classes of packets supported in the converged network protocol, but not the first communication protocol, and bandwidth percentages for the different classes of packets, wherein the function comprises a bandwidth management function, and wherein the implementing the function comprises guaranteeing the bandwidth percentages to the classes of packets according to bandwidth percentages provided for the packets in the configuration parameters.

9. The method of claim 1, wherein the computer product executes to communicate with a plurality of first type adaptors implementing the first communication protocol to forward packets from the first type adaptors, directed to the third communication protocol network, to the second adaptor.

10. A computer program product for managing communications among a first adaptor implementing a first communication protocol, a second adaptor implementing a converged network protocol, wherein the converged network protocol facilitates communication of packets encoded with a second communication protocol with a third communication protocol network, the computer program product comprising a computer readable storage device having computer readable program code embodied therein that is executed by a processor to communicate with the first and second adaptors and to perform operations, the operations comprising:
configuring parameters in a memory for communication between the first adaptor and the second adaptor in the converged network protocol to indicate to the second adaptor that the converged network protocol is supported, wherein the first adaptor does not support the converged network protocol;
receiving a packet at the first adaptor encoded in the second communication protocol directed to the third communication protocol network;
forwarding the packet to the second adaptor and then to the third communication protocol network;
receiving a command at the second adaptor, directed to the first adaptor, to implement a function in the converged network protocol for communication between the first and second adaptors; and
implementing the function using the parameters in the memory to support transmission of packets between the first and the second adaptors in the converged network protocol.

11. The computer program product of claim 10, wherein the first adaptor comprises a legacy Ethernet adaptor, wherein the first communication protocol comprises the Ethernet protocol, wherein the second adaptor comprises an enhanced Ethernet adaptor, the second communication protocol comprises Fibre Channel over Ethernet (FCoE), the converged network protocol includes the Data Center Bridging Exchange protocol that supports lossless transmission with a Fibre Channel network, and wherein the third communication protocol network comprises the Fibre Channel network.

12. The computer program product of claim 10, wherein the function comprises a first function, wherein the first function in the converged network protocol is not supported in the first communication protocol and in the first adaptor, and wherein the implementing the first function from the second adaptor comprises:
determining a second function in the first communication protocol and parameters to use with the first function to implement the first function from the second adaptor; and
transmitting the second function to the first adaptor.

13. The computer program product of claim 10, wherein the configuration parameters indicate traffic classes for packets recognized in the converged network protocol but not the first communication protocol, wherein the function comprises a pause for a selected one of the classes of packets from the first adaptor, and wherein the implementing the function further comprises:
receiving packets from the first adaptor;
determining whether the received packets are of the selected class;
delaying the transmission of the received packets to the second adaptor in response to determining that the packets are of the selected class; and
forwarding the received packets to the second adaptor in response to determining that the packets are not of the selected class.

14. The computer program product of claim 10, wherein the configuration parameters indicate classes of packets recognized in the converged network protocol but not the first communication protocol, wherein the function comprises a pause instruction in the converged network protocol for a selected one of the classes of packets from the first adaptor, and wherein the implementing the function further comprises:
sending a pause instruction in the first communication protocol to the first adaptor to cause the first adaptor to pause sending all packets.

15. The computer program product of claim 10, wherein the function comprises a pause instruction in the first communication protocol from the first adaptor to instruct the second adaptor to stop sending all packets, wherein the implementing the function further comprises
in response to the pause instruction, sending at least one instruction to the second adaptor in the converged network protocol to pause sending all classes of packets configured for communication with the second adaptor.

16. The computer program product of claim 10, wherein the function comprises a keep alive request from the second adaptor, and wherein the implementing the function further comprises sending the packet including the keep alive request to the first adaptor, wherein the keep alive request is processed by second communication protocol software in a host in a first communication protocol network.

17. The computer program product of claim 10, wherein the configuration parameters indicate classes of packets supported in the converged network protocol, but not the first communication protocol, and bandwidth percentages for the different classes of packets, wherein the function comprises a bandwidth management function, and wherein the implementing the function comprises guaranteeing the bandwidth percentages to the classes of packets according to bandwidth percentages provided for the packets in the configuration parameters.

18. The computer program product of claim 10, wherein the computer product executes to communicate with a plurality of first type adaptors implementing the first communication protocol to forward packets from the first type adaptors, directed to the third communication protocol network, to the second adaptor.

19. A system comprising: a bridge including:
a first adaptor implementing a first communication protocol;
a second adaptor implementing a converged network protocol, wherein the converged network protocol facilitates communication of packets encoded with a second communication protocol with a third communication protocol network, wherein the first adaptor does not support the converged network protocol;
a processor;
a memory including code executed by the processor to perform operations, the operations comprising:
configuring parameters in the memory for communication between the first adaptor and the second adaptor in the converged network protocol to indicate to the second adaptor that the converged network protocol is supported;
receiving a packet at the first adaptor encoded in the second communication protocol directed to the third communication protocol network;
forwarding the packet to the second adaptor and then to the third communication protocol network;
receiving a command at the second adaptor, directed to the first adaptor, to implement a function in the converged network protocol for communication between the first and second adaptors; and
implementing the function using the parameters in the memory to support transmission of packets between the first and the second adaptors in the converged network protocol.

20. The system of claim 19, wherein the first adaptor comprises a legacy Ethernet adaptor, wherein the first communication protocol comprises the Ethernet protocol, wherein the second adaptor comprises an enhanced Ethernet adaptor, the second communication protocol comprises Fibre Channel over Ethernet (FCoE), the converged network protocol includes the Data Center Bridging Exchange protocol that supports lossless transmission with a Fibre Channel network, and wherein the third communication protocol network comprises the Fibre Channel network.

21. The system of claim 19, wherein the function comprises a first function, wherein the function in the converged network protocol is not supported in the first communication protocol and in the first adaptor, and wherein the implementing the first function from the second adaptor comprises:
determining a second function in the first communication protocol and parameters to use with the function to implement the function from the second adaptor; and
transmitting the second function to the first adaptor.

22. The system of claim 19, wherein the configuration parameters indicate traffic classes for packets recognized in the converged network protocol but not the first communication protocol, wherein the function comprises a pause for a selected one of the classes of packets from the first adaptor, and wherein the implementing the function comprises:
receiving packets from the first adaptor;
determining whether the received packets are of the selected class;
delaying the transmission of the received packets to the second adaptor in response to determining that the packets are of the selected class; and
forwarding the received packets to the second adaptor in response to determining that the packets are not of the selected class.

23. The system of claim 19, wherein the configuration parameters indicate classes of packets recognized in the converged network protocol but not the first communication protocol, wherein the function comprises a pause instruction in the converged network protocol for a selected one of the classes of packets from the first adaptor, and wherein the implementing the function further comprises:
sending a pause instruction in the first communication protocol to the first adaptor to cause the first adaptor to pause sending all packets.

24. The system of claim 19, wherein the function comprises a pause instruction in the first communication protocol from the first adaptor to instruct the second adaptor to stop sending all packets, wherein the implementing the function further comprises:
in response to the pause instruction, sending at least one instruction to the second adaptor in the converged network protocol to pause sending all classes of packets configured for communication with the second adaptor.

25. The system of claim 19, wherein the function comprises a keep alive request from the second adaptor, and wherein the implementing the function further comprises sending the packet including the keep alive request to the first adaptor, wherein the keep alive request is processed by second communication protocol software in a host in a first communication protocol network.

26. The system of claim 19, wherein the configuration parameters indicate classes of packets supported in the converged network protocol, but not the first communication protocol, and bandwidth percentages for the different classes of packets, wherein the function comprises a bandwidth management function, and wherein the implementing the function comprises guaranteeing the bandwidth percentages to the classes of packets according to bandwidth percentages provided for the packets in the configuration parameters.

27. The system of claim 19, further comprising:
a plurality of first type adaptors implementing the first communication protocol to forward packets from the first type adaptor, directed to the third communication protocol network, to the second adaptor.

28. A system, comprising:
a host;
a switch; and
a bridge including:
a first adaptor implementing a first communication protocol in communication with the host;
a second adaptor implementing a converged network protocol in communication with the switch, wherein the converged network protocol facilitates communication of packets encoded with a second communication protocol with a third communication protocol network, wherein the first adaptor does not support the converged network protocol;
a processor;
a memory including code executed by the processor to perform operations, the operations comprising:
configuring parameters in the memory for communication between the first adaptor and the second adaptor in the converged network protocol to indicate to the second adaptor that the converged network protocol is supported;

receiving a packet at the first adaptor encoded in the second communication protocol directed to the third communication protocol network;

forwarding the packet to the second adaptor and then to the third communication protocol network;

receiving a command at the second adaptor, directed to the first adaptor, to implement a function in the converged network protocol for communication between the first and second adaptors; and implementing the function using the parameters in the memory to support transmission of packets between the first and the second adaptors in the converged network protocol.

29. The system of claim 28, wherein the host includes:

a host adaptor supporting the first communication protocol to communicate with the first adaptor in the bridge; and second communication protocol software for processing packets encoded with the second communication protocol.

* * * * *